(12) United States Patent
Diop et al.

(10) Patent No.: US 10,977,365 B2
(45) Date of Patent: Apr. 13, 2021

(54) PROTECTION OF AN ITERATIVE CALCULATION AGAINST HORIZONTAL ATTACKS

(71) Applicant: STMICROELECTRONICS (ROUSSET) SAS, Rousset (FR)

(72) Inventors: Ibrahima Diop, Marseilles (FR); Yanis Linge, Fuveau (FR); Pierre-Yvan Liardet, Peynier (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 319 days.

(21) Appl. No.: 16/041,077

(22) Filed: Jul. 20, 2018

(65) Prior Publication Data

US 2019/0034629 A1    Jan. 31, 2019

(30) Foreign Application Priority Data

Jul. 25, 2017   (FR) ...................................... 1757037

(51) Int. Cl.
| | |
|---|---|
| *G06F 21/00* | (2013.01) |
| *G06F 21/55* | (2013.01) |
| *G06F 21/60* | (2013.01) |
| *G06F 7/72* | (2006.01) |
| *H04L 9/00* | (2006.01) |
| *G06F 21/72* | (2013.01) |

(52) U.S. Cl.
CPC ............ *G06F 21/556* (2013.01); *G06F 7/723* (2013.01); *G06F 21/606* (2013.01); *G06F 21/72* (2013.01); *H04L 9/002* (2013.01); *G06F 2207/7257* (2013.01); *H04L 2209/08* (2013.01)

(58) Field of Classification Search
CPC .......... G06F 21/70; G06F 21/71; G06F 21/72; G06F 21/75; G06F 21/755; G06F 21/60; G06F 21/602; H04L 9/002; H04L 9/003
See application file for complete search history.

(56) References Cited

U.S. PATENT DOCUMENTS

| | | | |
|---|---|---|---|
| 6,008,075 | A | 12/1999 | Lien et al. |
| 8,139,763 | B2 | 3/2012 | Boscher et al. |

(Continued)

FOREIGN PATENT DOCUMENTS

| | | |
|---|---|---|
| EP | 1 134 653 A2 | 9/2001 |
| FR | 2 875 535 B1 | 3/2006 |

(Continued)

OTHER PUBLICATIONS

U.S. Appl. No. 16/810,434, filed Mar. 5, 2020, Protection of an Iterative Calculation.

(Continued)

*Primary Examiner* — Edward Zee
(74) *Attorney, Agent, or Firm* — Seed IP Law Group LLP

(57) ABSTRACT

An iterative calculation is performed on a first number and a second number, while protecting the iterative calculation against side-channel attacks. For each bit of the second number, successively, an iterative calculation routine of the bit of the second number is determined. The determination is made independent of a state of the bit. The determined iterative calculation routine of the bit is executed. A result of the iterative calculation is generated based on a result of the execution of the determined iterative calculation routine of a last bit of the second number.

29 Claims, 4 Drawing Sheets

(56) References Cited

U.S. PATENT DOCUMENTS

| | | |
|---|---|---|
| 9,014,368 B2 | 4/2015 | Teglia |
| 10,025,559 B2 | 7/2018 | Diop et al. |
| 10,354,063 B2 | 7/2019 | Diop et al. |
| 2005/0078821 A1 | 4/2005 | Jin et al. |
| 2008/0175385 A1 | 7/2008 | Lee et al. |
| 2009/0067617 A1 | 3/2009 | Trichina et al. |
| 2009/0092245 A1* | 4/2009 | Fumaroli .............. G06F 7/723 380/28 |
| 2009/0097637 A1 | 4/2009 | Boscher et al. |
| 2014/0281573 A1* | 9/2014 | Jaffe .............. G06F 7/723 713/189 |
| 2015/0063561 A1 | 3/2015 | Teglia |

FOREIGN PATENT DOCUMENTS

| | | |
|---|---|---|
| FR | 2 979 725 A1 | 3/2013 |
| FR | 2 979 2725 A1 | 3/2013 |
| GB | 2 399 904 B | 9/2004 |
| WO | 2006/103341 A1 | 10/2006 |
| WO | 2016/053792 A1 | 4/2016 |

OTHER PUBLICATIONS

U.S. Appl. No. 16/435,309, filed Jun. 7, 2019, Protection of an Iterative Calculation.

Itoh et al., "DPA Countermeasures by Improving the Window Method," *Lecture Noted in Computer Sciences* 2523:303-317, 2002.

Kim et al., "Safe-Error Attack on SPA-FA Resistant Exponentiations Using a HW Modular Multiplier," International Conference on Information Security and Cryptology, Seoul, South Korea, 2007, 9 pages.

Choi et al., "An Improved Square-always Exponentiation Resistant to Side-channel Attacks on RSA Implementation," *Intelligent Automation & Soft Computing* 22(3):353-363, 2016.

Clavier et al., "Horizontal Correlation Analysis on Exponentiation," *Twelfth International Conference on Information and Communications Security*, Barcelona, Spain, Dec. 2010, 19 pages.

Feix et al., "Side-Channel Analysis on Blinded Regular Scalar Multiplications," *Proceedings of INDOCRYPT 2014*, Jan. 1, 2014, 25 pages.

French Search Report, dated Jul. 31, 2017, for French Application No. 1657860, 8 pages.

French Search Report, dated Jun. 23, 2017, for French Application No. 1657861, 8 pages.

French Search Report, dated Mar. 9, 2018, for French Application No. 1757037, 8 pages.

Ha et al., "Power Analysis Attacks on the Right-to-Left Square-Always Exponentiation Algorithm," *Journal of Internet Services and Information Security* 4(4):38-51, 2014.

Joye et al., "The Montgomery Powering Ladder," *Cryptographic Hardware and Embedded Systems International Workshop 2002*, Aug. 13, 2002, 12 pages.

Lesavourey et al., "Efficient Randomized Regular Modular Exponentiation using Combined Montgomery and Barrett Multiplications," *Thirteenth International Conference on Security and Cryptography*, Lisbon, Portugal, Jul. 2016, 9 pages.

\* cited by examiner

PROTECTION OF AN ITERATIVE CALCULATION AGAINST HORIZONTAL ATTACKS

BACKGROUND

Technical Field

The present disclosure generally relates to electronic circuits and, more specifically, to circuits executing iterative operations. The present disclosure more specifically relates to the protection of such calculations against attacks aiming at discovering quantities manipulated by the calculations.

Description of the Related Art

In many applications, electronic circuits implement algorithms of encryption, authentication, signature calculation, and more generally algorithms manipulating data, called secret, that is, the access to which is desired to be reserved to certain users or circuits. Among such algorithms, some use iterative operations, for example, for a modular exponentiation, for example, RSA-type algorithms.

There exist many methods, called attacks, to attempt discovering or pirating secret data manipulated by such calculations. Among such attacks, so-called side channel attacks, use indirect information such as the power consumption of the circuit (SPA, DPA attacks), the electromagnetic radiation thereof, etc. The interpretation of such information gives the pirate information relative to the secret data.

Among side-channel attacks, one can in particular distinguish attacks called vertical and attacks called horizontal. Vertical attacks comprise using the observation of information leaks measured during a plurality of executions using the same secret information by means of statistical tools and by time sampling. Horizontal attacks comprise comparing segments originating from a same trace (for example, power consumption or radiation) with one another, to extract the secret information. They use a single execution trace. Data masking countermeasures, which are generally efficient against vertical side channel attacks, are generally not efficient against horizontal attacks.

BRIEF SUMMARY

An embodiment facilitates addressing all or part of the disadvantages of usual methods and circuits of protection of data manipulated by algorithms against side-channel attacks.

In an embodiment, a method of protection is provided against an attack on an iterative calculation on a first number and a second number, executed by an electronic circuit, wherein the steps of the iterative calculation are different for certain bits of the second number independently from the state of the concerned bit.

According to an embodiment, a selection of the steps of the iterative calculation is randomly performed.

According to an embodiment, the steps of the iterative calculation are selected from among two modular calculation algorithms.

According to an embodiment, the steps of the iterative calculation are different according to the state of the bit of the second number.

According to an embodiment, the method comprises the steps of:
  initializing memory locations or registers;
  successively, for each bit of the second number:
    selecting an algorithm to be used for the iterative calculation steps of the current iteration;
    updating the memory locations or registers if necessary; and
    executing the iterative calculation steps of the selected algorithm.

According to an embodiment, the selection of the algorithm is random.

According to an embodiment, the method comprises the steps of:
  initializing a first memory location or register to one;
  initializing a second memory location or register to the value of the first number; and
  successively, for each bit of the second number:
    selecting the steps of iterative calculation between those of a first algorithm and those of a second algorithm; and
    in case of a change of algorithm, updating the content of the second memory location or register before executing the iterative calculation steps.

According to an embodiment, the result of the calculation is contained in said first memory location or register.

According to an embodiment, the calculation is a modular exponentiation, the second number representing an exponent to be applied to the first number.

According to an embodiment:
  the first algorithm implements a square-and-multiply always method; and
  the second algorithm is a Montgomery multiplication.

According to an embodiment, the calculation is a scalar multiplication on an elliptic curve, the second number being a scalar to be multiplied by the first number.

An embodiment provides an electronic circuit configured to implement the method.

The foregoing and other features and advantages of various embodiments will be discussed in detail in the following non-limiting description of specific embodiments in connection with the accompanying drawings.

In an embodiment, a method comprises: executing, using an electronic circuit, an iterative calculation on a first number and a second number, the executing including protecting the iterative calculation against side-channel attacks by, successively for each bit of the second number: determining, independent of a state of the bit of the second number, an iterative calculation routine of the bit of the second number; and executing the determined iterative calculation routine; and generating a result of the iterative calculation based on a result of the determined iterative calculation routine of a last bit of the second number. In an embodiment, the iterative calculation routine is selected from a set of iterative calculation routines. In an embodiment, the iterative calculation is a modular exponentiation, the second number representing an exponent to be applied to the first number. In an embodiment, the set of iterative calculation routines comprises: a square-and-multiple always routine; and a Montgomery multiplication routine. In an embodiment, the determining the iterative calculation routine of a bit of the second number is performed randomly. In an embodiment, steps of the iterative calculation routine vary according to the state of the bit of the second number. In an embodiment, the method comprises: initializing variables stored in a memory prior to executing the iterative calculation; after determining the iterative calculation routine of a bit, determining whether to update a variable stored in the memory prior to execution of the determined iterative calculation routine; and in response to a determination to update the variable stored in the memory, updating the variable stored in the memory prior to execution of the determined iterative calculation routine. In an embodiment, the determination of the iterative calculation routine of a bit is random. In an embodiment, the method comprises: initializing a first memory location or register to one; initializing a second memory location or register to a value of the first number; and successively, for each bit of the second number: selecting an iterative calculation routine between a first routine and a second routine; and in case of a change of routine, updating content of the second memory register or location before executing the selected iterative calculation routine. In an embodiment, the result of the iterative calculation is contained in said first memory location or register after execution of the determined iterative calculation routine of the last bit of the second number. In an embodiment, the iterative calculation is a scalar multiplication on an elliptic curve, the second number being a scalar to be multiplied by the first number.

In an embodiment, a device comprises: a memory; and processing circuitry, coupled to the memory, wherein the processing circuitry, in operation, executes an iterative calculation on a first number and a second number, the executing including protecting the iterative calculation against side-channel attacks by, successively for each bit of the second number: determining, independent of a state of the bit of the second number, an iterative calculation routine of the bit of the second number; and executing the determined iterative calculation routine of the bit, wherein a result of the iterative calculation is based on a result of the determined iterative calculation routine of a last bit of the second number. In an embodiment, the determined iterative calculation routine of a bit is selected from a set of iterative calculation routines. In an embodiment, the iterative calculation is a modular exponentiation, the second number representing an exponent to be applied to the first number. In an embodiment, the set of iterative calculation routines comprises: a square-and-multiple always routine; and a Montgomery multiplication routine. In an embodiment, the iterative calculation routine of the bit of the second number is randomly selected from the set. In an embodiment, steps of the determined iterative calculation routine of a bit vary according to the state of the bit of the second number. In an embodiment, the processing circuitry, in operation: initializes variables stored in the memory prior to executing the iterative calculation; after determining the iterative calculation routine of a bit, determines whether to update a variable stored in the memory prior to execution of the determined iterative calculation routine; and in response to a determination to update the variable stored in the memory, updates the variable stored in the memory prior to execution of the determined iterative calculation routine. In an embodiment, the determination of the iterative calculation routine of a bit is random. In an embodiment, the processing circuitry, in operation: initializes a first memory location or register of the memory to one; initializes a second memory location or register of the memory to a value of the first number; and successively, for each bit of the second number: selects an iterative calculation routine between a first routine and a second routine; and in case of a change of routine, updates content of the second memory register or location before executing the selected iterative calculation routine. In an embodiment, the result of the iterative calculation is contained in said first memory location or register after execution of the determined iterative calculation routine of the last bit of the second number. In an embodiment, the iterative calculation is a scalar multiplication on an elliptic curve, the second number being a scalar to be multiplied by the first number.

In an embodiment, a system, comprises: one or more processing cores, which, in operation, process digital data; and cryptographic circuitry, coupled to the one or more processing cores, wherein the cryptographic circuitry, in operation, executes an iterative calculation on a first number and a second number, the executing including protecting the iterative calculation against side-channel attacks by, successively for each bit of the second number: determining, independent of a state of the bit of the second number, an iterative calculation routine of the bit of the second number; and executing the determined iterative calculation routine of the bit, wherein a result of the iterative calculation is based on a result of the determined iterative calculation routine of a last bit of the second number. In an embodiment, the iterative calculation is a modular exponentiation, the second number representing an exponent to be applied to the first number. In an embodiment, the iterative calculation is a scalar multiplication on an elliptic curve, the second number being a scalar to be multiplied by the first number. In an embodiment, the one or more processing cores, in operation, process a transaction based on a result of the iterative calculation.

In an embodiment, a non-transitory computer-readable medium has contents which cause one or more processing devices to perform a method, the method comprising: executing an iterative calculation on a first number and a second number, the executing including protecting the iterative calculation against side-channel attacks by, successively for each bit of the second number: determining, independent of a state of the bit of the second number, an iterative calculation routine of the bit of the second number; and executing the determined iterative calculation routine of the bit, wherein a result of the iterative calculation is based on a result of the determined iterative calculation routine of a last bit of the second number. In an embodiment, the iterative calculation is a modular exponentiation, the second number representing an exponent to be applied to the first number. In an embodiment, the iterative calculation is a scalar multiplication on an elliptic curve, the second number being a scalar to be multiplied by the first number. In an embodiment, the method comprises processing a transaction based on a result of the iterative calculation.

DETAILED DESCRIPTION

Figure 1:
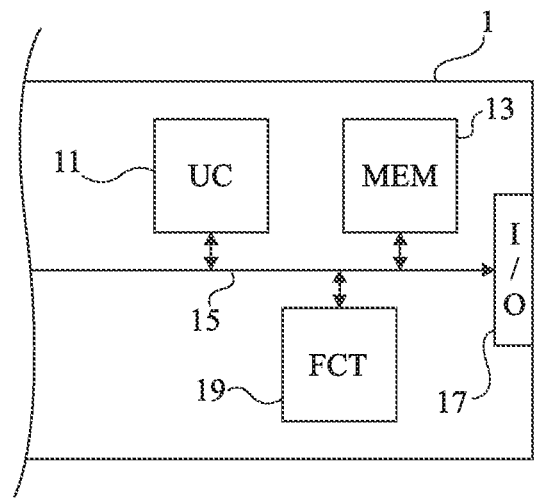
FIG. 1 schematically shows an embodiment of an electronic circuit.

The same elements have been designated with the same reference numerals in the different drawings, unless the context indicates otherwise. In particular, the structural and/or functional elements common to the different embodiments may be designated with the same reference numerals and may have identical structural, dimensional, and material properties.

For clarity, only those steps and elements which are useful to the understanding of the embodiments which will be described have been shown and will be detailed. In particular, the applications of the executed calculations or of the circuits executing them have not been detailed, the described embodiments being compatible with usual applications.

Unless otherwise specified, when reference is made to two elements connected together, this means directly connected with no intermediate element other than conductors, and when reference is made to two elements coupled together, this means that the two elements may be directly coupled (connected) or coupled via one or a plurality of other elements.

FIG. 1 very schematically shows an electronic circuit 1 of the type to which the embodiments which will be described may apply.

Circuit 1 comprises:
- a calculation unit or circuitry 11 (UC), for example, a state machine, a microprocessor, a programmable logic circuit, an IP core, etc.;
- one or a plurality of volatile and/or non-volatile storage areas or memories 13 (MEM) for storing all or part of the data and keys;
- one or a plurality of data, address, and/or control buses 15 between the different elements internal to circuit 1 and an input-output interface 17 (I/O) for communicating with the outside of circuit 1.

Circuit 1 may include various other circuits according to the application, symbolized in FIG. 1 by a functional block or circuit 19 (FCT).

Iterative calculation operations, for example, of modular exponentiation, can be found in many encryption algorithms, among which, for example, the algorithm known as RSA.

A modular exponentiation comprises calculating result C of the exponentiation of a number M by an exponent e (integer) modulo N, that is, applying formula:

$$C=M^e (\mod N).$$

Most often:
- number M represents a number (or an information representative of the number) which is desired to be encrypted, authenticated, signed, etc.; and
- exponent e and modulo N (pair (e, N)) represent an encryption key, the authentication key, the signature key, etc. (or information representative of the key).

To simplify the following description, reference will be made to a modular exponentiation, noted $C=M^e (\mod N)$, the transposition to the variables used according to the operation performed in practice being within the abilities of those skilled in the art.

The calculation of the modular exponentiation by an electronic circuit (a state machine, a processor executing the method in the form of a program, a programmable logic circuit, etc.), for example, circuit 1, is for example achieved by applying a so-called Montgomery powering ladder method, by applying a so-called square-and-multiply always method, or other methods based on the use of two variables or registers and by performing iterative calculations for each bit of the exponent.

In the above-described example, the calculation uses at least two registers of circuit 1, or two memory locations, arbitrarily noted T0 and T1, on which the operations will be performed.

The message, for example, number M, to be submitted to the modular exponentiation is loaded into register T1. Exponent e is read bit by bit during the calculation.

Hereafter, for simplification, the registers and their contents will be confounded, that is, when reference is made to operations on the registers, this means on the contents thereof.

Figure 2:
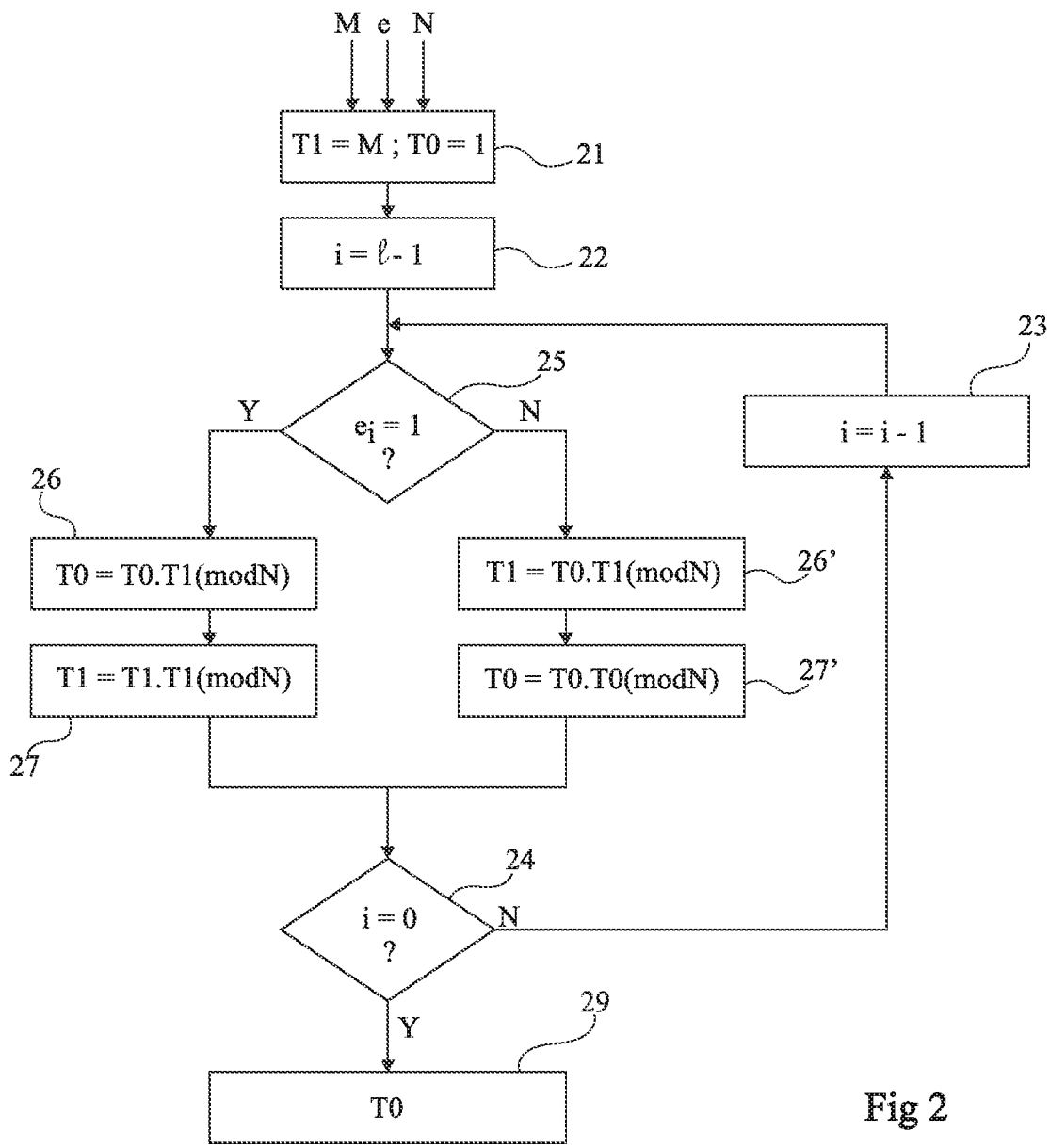
FIG. 2 schematically shows an example of a modular exponentiation calculation based on the so-called Montgomery powering ladder method.

FIG. 2 shows, in the form of blocks, the steps of a calculation by the Montgomery powering ladder method.

In a first step (block 21, T1=M, T0=1), register T1 is loaded with number M and register T0 is reset to 1. Exponent e is loaded into another register (not shown) or can be found in the memory ($e_i$ represents each bit of exponent e, where i designates the rank from 0 to I-1).

A loop calculation on the bits of exponent e is then started. For example, a counter i is initialized to I-1 (block 22, i=I-1) and is decremented by 1 (block 23, i=i-1) each time a bit $e_i$ of the exponent is processed, as long as not all the bits have been processed (block 24, i=0?).

For each iteration, that is, for each bit $e_i$, from left to right, it is started by testing the value of the bit of the exponent (block 25, $e_i$=1?).

If current bit $e_i$ is 1 (output Y of block 25), the content of register T0 is multiplied, modulo N, by the content of register T1 and the result is placed in register T0 (block 26, T0=T0·T1 (mod N)), after which the content of register T1 is squared, modulo N, and the result is placed in register T1 (block 27, T1=T1·T1 (mod N)).

If current bit $e_i$ is 0 (output N of block 25), the content of register T0 is multiplied, modulo N, by the content of register T1 and the result is placed in register T1 (block 26', T1=T0·T1 (mod N)), after which the content of register T0 is squared, modulo N, and the result is placed in register T0 (block 27', T0=T0·T0 (mod N)).

As long as not all the bits of exponent e have been processed (output N of block 24), counter i is decremented (block 23) and it is returned to step 25. Once all the bits of exponent e have been processed (output Y of block 24), register T0 contains the result of the modular exponentiation (block 29, T0), that is, value $C=M^e$ (mod N). The result may be used by the circuit 1 to process a transaction, for example the result may be provided to the function circuit 19 to process a transaction based on or using the result.

The calculation illustrated in FIG. 2 may also be written as follows:

T0=1 (step 21)
T1=M (step 21)
For i=I-1 to 0 (steps 22 to 27):

$b=1-e_i$ $Tb=Tb \cdot Te_i (\mod N)$ $Te_i=Te_i \cdot Te_i (\mod N)$

End of loop (output Y of block 24)
Return T0 (step 29).

Figure 3:
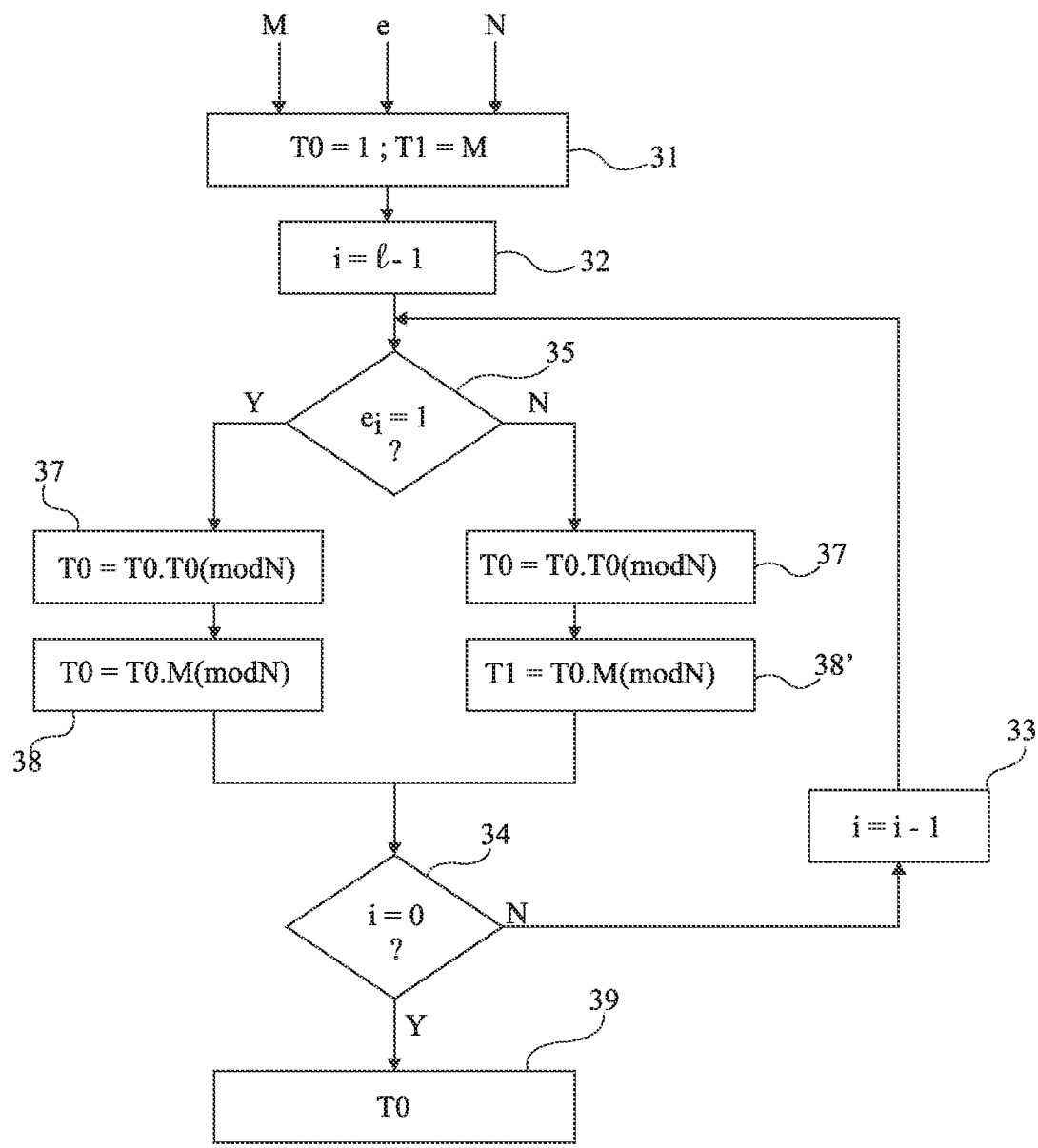
FIG. 3 schematically shows an example of a modular exponentiation calculation based on the so-called square-and-multiply always method.

FIG. 3 shows in the form of blocks the steps of a modular exponentiation calculation by the square-and-multiply always method.

As in FIG. 2, the calculation uses at least two registers of circuit 1, or two memory locations, arbitrarily noted T0 and T1, on which the operations will be performed.

At a first step (block 31, T0=1, T1=M), register T0 is initialized to 1 and register T1 is loaded with number M. Exponent e is here again loaded into another register (not shown) or can be found in the memory ($e_i$ representing each bit of exponent e, where i designates the rank from 0 to I-1).

A loop calculation on the bits of exponent e is then started. For example, a counter i is initialized to I−1 (block 32, i=I−1) and is decremented by 1 (block 33, i=i−1) each time a bit $e_i$ of the exponent is processed as long as not all the bits have been processed (block 34, i=0?).

For each iteration, that is, for each bit $e_i$, from left to right, it is started by testing the value of the exponent bit (block 35, $e_i$=1?).

If current bit $e_i$ is at 1 (output Y of block 35), the content of register T0 is squared, modulo N, and the result is placed in register T0 (block 37, T0=T0·T0 (mod N)), then the content of register T0 is multiplied, modulo N, by number M and the result is placed in register T0 (block 38, T0=T0·M (mod N)).

If current bit $e_i$ is at 0 (output N of block 35), the content of register T0 is squared, modulo N, and the result is placed in register T0 (block 37, T0=T0·T0 (mod N)), after which the content of register T0 is multiplied, modulo N, by number M and the result is placed in register T1 (block 38', T1=T0·T1 (mod N)).

As long as not all the bits of exponent e have been processed (output N of block 34), counter i is decremented (block 33) and it is returned to step 35. Once all the bits of exponent e have been processed (output Y of block 34), register T0 contains the result of the modular exponentiation (block 39, T0), that is, value C=$M^e$ (mod N).

The calculation illustrated in FIG. 3 may also be written as follows:

T0=1 (step 31)
T1=M (step 31)
For i=I−1 to 0 (steps 32 to 38):

$$b = 1 - e_i$$

$$T0 = T0 \cdot T0 (\text{mod } N)$$

$$Tb = T0 \cdot M (\text{mod } N)$$

End of loop (output Y of block 34)
Return T0 (step 39).

It has already been provided, be it for the example of FIG. 2 or for that of FIG. 3, to introduce random numbers to mask input data M, e, and N.

Such a solution is efficient against vertical attacks. However, such a masking technique has no effect on horizontal attacks since horizontal attacks use a single trace, and thus a single execution.

Figure 4:
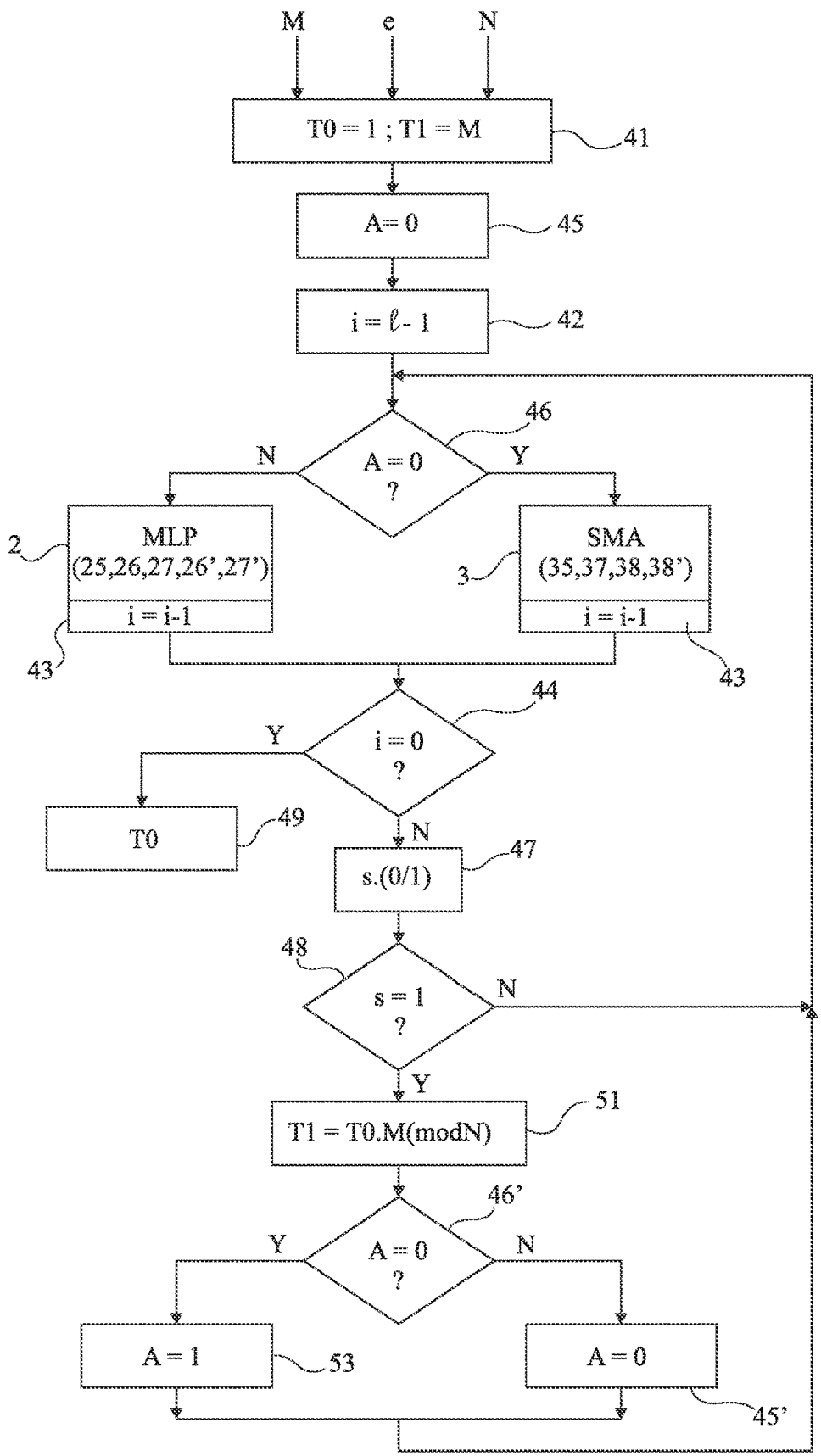
FIG. 4 shows, in the form of blocks, an embodiment of a method of protecting a modular exponentiation calculation, applied to the algorithms of FIGS. 2 and 3.

FIG. 4 shows, in the form of blocks, an embodiment of a method of protection of a modular exponentiation calculation resisting horizontal side-channel attacks.

Advantage is taken of the fact that most modular exponentiation algorithms use registers having a predictable content at each end of the processing of a bit of the exponent. Further, in most cases, the register intended to contain the result has the same content whatever the algorithm used.

As previously, the aim is to calculate value C=$M^e$ (mod N).

The calculation uses two registers of circuit 1, arbitrarily called T0 and T1, on which the operations will be performed. Similarly, the message, for example, number M, to be submitted to the modular exponentiation is loaded into register T1. Exponent e is here again loaded into another register (not shown) or can be found in the memory ($e_i$ representing each bit of exponent e, where i designates the rank in the range from 0 to I−1).

According to a described embodiment, the algorithm or routine to be used to process a bit or a set of bits of the exponent, that is, the operations performed on registers T0 and T1, is randomly selected. The selection may be performed for each bit of the exponent.

Thus, in the example shown in FIG. 4, for certain bits of the exponent, the Montgomery powering ladder algorithm is used (FIG. 2) and for the other bits, the square-and-multiply always algorithm is used (FIG. 3). In this example, the steps concerned by the change of algorithm or routine are steps 25, 26, 27, 26', 27', and steps 35, 37, 38, 38'.

For each change of algorithm or routine, it is provided to modify, if need be, the content of register T1 to make it compatible with the next iteration performed by the other algorithm or routine.

Thus, at a first step (block 41, T1=M, T0=1), register T0 is, as previously, initialized to 1 and register T1 is loaded, for example, with number M. Exponent e is loaded into another register (not shown) or can be found in the memory ($e_i$ representing each bit of exponent e, where i designates the rank from 0 to I−1).

The algorithm to be used for the first operation, that is, for the first bit of the exponent, is then selected. Such a selection is arbitrarily symbolized by the initialization of a flag A to value 0 (block 45, A=0), where the flag can take two values (0 or 1).

A loop calculation on the bits of exponent e is then started. For example, a counter i is initialized to I−1 (block 42, i=I−1) and is decremented by 1 (block 43, i=i−1) each time a bit $e_i$ of the exponent is processed, as long as not all the bits have been processed (block 44, i=0?).

According to an embodiment, registers T0 and T1 used for the application of the two algorithms are the same and it is just made sure that the content of each register used for the next iteration is adapted to the algorithm used.

Thus, for each iteration, that is for each bit $e_i$ from left to right, it is started by verifying the state of flag A (block 46, A=0?) to select the algorithm to be executed. For example, if flag A is at 1 (output N of block 46), the Montgomery algorithm and thus steps 25 and then 26 and 27, or 26' and 27' of the algorithm of FIG. 2, is executed (block 2, MLP (25, 26, 27, 26', 27')) on the current bit $e_i$ of the exponent. Conversely, if flag A is at 0 (output Y of block 46), the square-and-multiply always algorithm, and thus steps 35, and then 37 and 38 or 38' of the algorithm of FIG. 3, is executed (block 3, SMA (35, 37, 38, 38')) on the current bit $e_i$ of the exponent. The decrementing of counter i (block 43, i=i−1) occurs after the processing of bit $e_i$ of the exponent by one or the other of the algorithms.

As long as not all the bits of exponent e have been processed (output N of block 44), a random selection is performed to determine whether the algorithm is changed or not for the next iteration (the now-current bit of the exponent). For example, a bit s is randomly drawn (block 47, s (0/1)) and the state of bit s conditions (block 48, s=1?) whether the same algorithm is kept for the next iteration. If bit s is at 0 (output N of block 48), it is returned to block 46 to process the exponent bit. If bit s is at 1 (output Y of block 48), steps of inversion of the algorithm used are started. To achieve this, it is necessary to change the value of flag A and the contents of registers T0 and T1 so that they are adapted to the execution of the next iteration by the other algorithm.

Actually, with the algorithms taken as an example (the Montgomery powering ladder algorithm and the square-and-multiply always algorithm), nothing has to be done on register T0. However, to switch from the square-and-multiply always algorithm (FIG. 3) to the Montgomery algorithm (FIG. 2), register T1 has to be updated (block 51, T1=T0·M (mod N)) to value T0·M (mod N). The other way round, to switch from the Montgomery algorithm to the square-andmultiply always algorithm, it would be possible to make no update, the contents of registers T0 and T1 being, at the end of each iteration according to the Montgomery algorithm, compatible for a direct execution of the next iteration with the square-and-multiply always algorithm. However, to balance calculations (which is useful against vertical attacks), it is possible to perform the same operation 51.

The value of flag A is then tested (block 46', A=0?). If its value is 1 (output N of block 46'), the state of flag A is inverted so that it is at 0 (block 45', A=0) to switch from the Montgomery algorithm (FIG. 2) to the square-and-multiply always algorithm (FIG. 3). If the value of flag A is 0 (output Y of block 46'), the state of flag A is inverted so that it is at 1 (block 53, A=1) to switch from the square-and-multiply always algorithm (FIG. 3) to the Montgomery algorithm (FIG. 2).

It is then returned to block 46 to process the exponent bit, now having changed algorithm.

Step 51 may be carried out after test 46'.

Once all the bits of exponent e have been processed (output Y of block 44), register T0 contains the result of the modular exponentiation (block 49, T0), that is, value $C=M^e$ (mod N).

In the embodiment of FIG. 4, advantage is taken of the structure of the algorithms used, which does not require modifying register T0 in case of a charge of algorithm from one iteration to another.

Figure 5:
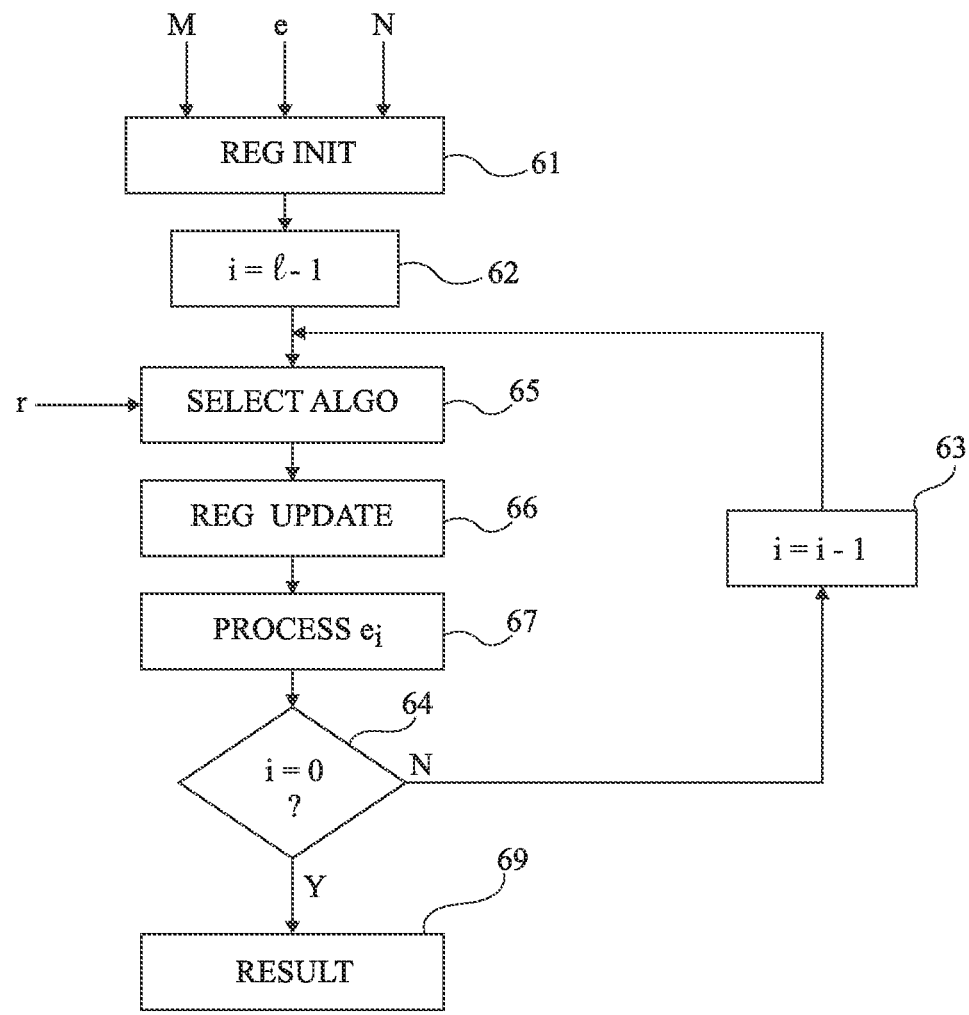
FIG. 5 shows, in the form of blocks, another embodiment of a method of protecting an iterative calculation.

FIG. 5 shows, in the form of blocks, another embodiment of a method of protecting a modular exponentiation calculation.

At a first step (block 61, REG INIT), the registers used for the calculation are initialized and values M, e, and N are loaded.

A loop calculation on the bits of exponent e is then started. For example, a counter i is initialized to I−1 (block 62, i=I−1) and is decremented by 1 (block 63, i=i−1) each time a bit $e_i$ of the exponent is processed, as long as not all the bits have been processed (block 64, i=0?).

For each iteration, the algorithm to be used for the current iteration is randomly selected (block 65, SELECT ALGO), for example, by drawing a random number r.

The contents of the registers are then updated if necessary (block 66, REG UPDATE) according to the algorithm to be executed.

Then, the steps of the iterative calculation are executed (block 67, PROCESS $e_i$) according to the selected algorithm.

As long as not all the bits of exponent e have been processed (output N of block 64), counter i is decremented (block 63) and it is returned to step 65. Once all the bits of exponent e have been processed (output Y of block 64), the result of the modular exponentiation (block 69, RESULT), that is, value $C=M^e$ (mod N), is delivered.

It should be noted that the selection of the algorithm to be used for the iterative calculation steps is independent from the state of the exponent bit. A selection is performed according to the exponent bit within these steps.

An advantage of the described embodiments is that by changing, within an execution of an iterative calculation, the algorithm used from one iteration to another independently from the state of the exponent bit, for example randomly and thus also independent from the rank of this exponent bit, the number of values that can be used for a horizontal attack is decreased.

Further, the fact of changing the behavior of the circuit from one iteration to the other makes it more difficult to find points of interest in the circuit trace.

Another advantage of an embodiment of the provided countermeasure is that it is also efficient in the case of vertical attacks.

Further, more than two different algorithms may be used, for example, a sequence of a plurality of algorithms may be provided with a random selection over more than one bit to select the algorithm to be used for each iteration.

Further, the protection process discussed in relation with FIG. 5 also applies to the protection of a calculation of a scalar product of points on elliptic curves. Scalar multiplication operations are used for calculations on elliptic curves, which form another category of encryption algorithms. A scalar multiplication comprises calculating result C of the multiplication of a point P of an elliptic curve by an integer d (scalar) modulo N, that is, applying formula:

$$C = d \cdot P (\bmod N).$$

Most often:
point P represents the number (or information representative of the number) which is desired to be encrypted, authenticated, signed, etc.; and
scalar d and modulo N (pair (d, N)) represent the encryption key, the authentication key, the signature key, etc. (or information representative of the key).

As for a modular exponentiation, the scalar multiplication on an elliptic curve by an electronic circuit (a state machine, a processor executing the method in the form of a program, a programmable logic circuit, etc.), for example, circuit 1, is most often performed by using an iterative calculation on the bits of the scalar. Thus, in the same way as for a modular exponentiation, it is provided to change algorithm from one bit to the other of the scalar.

Finally, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    executing, using an electronic circuit, an iterative calculation on a first number and a second number, wherein the iterative calculation is a modular exponentiation, the second number representing an exponent to be applied to the first number, the executing including protecting the iterative calculation against side-channel attacks by, successively for each bit of the second number:
    determining, independent of a state of the bit of the second number, an iterative calculation routine of the bit of the second number, wherein the determined iterative calculation routine is selected from a set of iterative calculation routines comprising a square-and-multiple always routine and a Montgomery multiplication routine, and the determining the iterative calculation routine of the bit of the second number is performed randomly; and
    executing the determined iterative calculation routine; and
    generating a result of the iterative calculation based on a result of the determined iterative calculation routine of a last bit of the second number.

2. The method of claim 1 wherein steps of the determined iterative calculation routine vary according to the state of the bit of the second number.

3. The method of claim 1, comprising:
    initializing variables stored in a memory prior to executing the iterative calculation;
    after determining the iterative calculation routine of a bit, determining whether to update a variable stored in the memory prior to execution of the determined iterative calculation routine; and
    in response to a determination to update the variable stored in the memory, updating the variable stored in the memory prior to execution of the determined iterative calculation routine.

4. The method of claim 3 wherein the determination of the iterative calculation routine of a bit is random.

5. The method of claim 1, comprising:
    initializing a first memory location or register to one;
    initializing a second memory location or register to a value of the first number; and
    successively, for each bit of the second number:
        selecting an iterative calculation routine between a first routine and a second routine; and
        in case of a change of routine, updating content of the second memory register or location before executing the selected iterative calculation routine.

6. A method, comprising:
    executing, using an electronic circuit, an iterative calculation on a first number and a second number, the executing including protecting the iterative calculation against side-channel attacks by, successively for each bit of the second number:
    determining, independent of a state of the bit of the second number, an iterative calculation routine of the bit of the second number; and
    executing the determined iterative calculation routine; and
    generating a result of the iterative calculation based on a result of the determined iterative calculation routine of a last bit of the second number, wherein the method comprises:
    initializing a first memory location or register to one;
    initializing a second memory location or register to a value of the first number; and
    successively, for each bit of the second number:
        selecting an iterative calculation routine between a first routine and a second routine; and
        in case of a change of routine, updating content of the second memory register or location before executing the selected iterative calculation routine, wherein the result of the iterative calculation is contained in said first memory location or register after execution of the determined iterative calculation routine of the last bit of the second number.

7. The method of claim 6 wherein the determined iterative calculation routine is selected from a set of iterative calculation routines.

8. The method of claim 7 wherein the iterative calculation is a modular exponentiation, the second number representing an exponent to be applied to the first number.

9. The method of claim 8 wherein the set of iterative calculation routines comprises:
    a square-and-multiple always routine; and
    a Montgomery multiplication routine.

10. The method of claim 9 wherein the determining the iterative calculation routine of the bit of the second number is performed randomly.

11. The method of claim 6 wherein the iterative calculation is a scalar multiplication on an elliptic curve, the second number being a scalar to be multiplied by the first number.

12. A device, comprising:
    a memory; and
    processing circuitry, coupled to the memory, wherein the processing circuitry, in operation, executes an iterative calculation on a first number and a second number, wherein the iterative calculation is a modular exponentiation, the second number representing an exponent to be applied to the first number, the executing including protecting the iterative calculation against side-channel attacks by, successively for each bit of the second number:
    determining, independent of a state of the bit of the second number, an iterative calculation routine of the bit of the second number, wherein the determined iterative calculation routine is selected from a set of iterative calculation routines comprising a square-and-multiple always routine and a Montgomery multiplication routine, and the determining the iterative calculation routine of the bit of the second number is performed randomly; and
    executing the determined iterative calculation routine of the bit, wherein a result of the iterative calculation is based on a result of the determined iterative calculation routine of a last bit of the second number.

13. The device of claim 12 wherein steps of the determined iterative calculation routine of the bit vary according to the state of the bit of the second number.

14. The device of claim 12 wherein the processing circuitry, in operation:
initializes variables stored in the memory prior to executing the iterative calculation;
after determining the iterative calculation routine of a bit, determines whether to update a variable stored in the memory prior to execution of the determined iterative calculation routine; and
in response to a determination to update the variable stored in the memory, updates the variable stored in the memory prior to execution of the determined iterative calculation routine.

15. The device of claim 14 wherein the determination of the iterative calculation routine of a bit is random.

16. The device of claim 12 wherein the processing circuitry, in operation:
initializes a first memory location or register of the memory to one;
initializes a second memory location or register of the memory to a value of the first number; and
successively, for each bit of the second number:
selects an iterative calculation routine between a first routine and a second routine; and
in case of a change of routine, updates content of the second memory register or location before executing the selected iterative calculation routine.

17. A device, comprising:
a memory; and
processing circuitry, coupled to the memory, wherein the processing circuitry, in operation, executes an iterative calculation on a first number and a second number, the executing including protecting the iterative calculation against side-channel attacks by, successively for each bit of the second number:
determining, independent of a state of the bit of the second number, an iterative calculation routine of the bit of the second number; and
executing the determined iterative calculation routine of the bit, wherein a result of the iterative calculation is based on a result of the determined iterative calculation routine of a last bit of the second number, wherein the processing circuitry, in operation:
initializes a first memory location or register of the memory to one;
initializes a second memory location or register of the memory to a value of the first number; and
successively, for each bit of the second number:
selects an iterative calculation routine between a first routine and a second routine; and
in case of a change of routine, updates content of the second memory register or location before executing the selected iterative calculation routine,
wherein the result of the iterative calculation is contained in said first memory location or register after execution of the determined iterative calculation routine of the last bit of the second number.

18. The device of claim 17 wherein the determined iterative calculation routine of the bit of the second number is selected from a set of iterative calculation routines.

19. The device of claim 18 wherein the iterative calculation is a modular exponentiation, the second number representing an exponent to be applied to the first number.

20. The device of claim 19 wherein the set of iterative calculation routines comprises:
a square-and-multiple always routine; and
a Montgomery multiplication routine.

21. The device of claim 20 wherein the determined iterative calculation routine of the bit of the second number is randomly selected from the set.

22. The device of claim 17 wherein the iterative calculation is a scalar multiplication on an elliptic curve, the second number being a scalar to be multiplied by the first number.

23. A system, comprising:
one or more processing cores, which, in operation, process digital data; and
cryptographic circuitry, coupled to the one or more processing cores, wherein the cryptographic circuitry, in operation, executes an iterative calculation on a first number and a second number, wherein the iterative calculation is a modular exponentiation, the second number representing an exponent to be applied to the first number, the executing including protecting the iterative calculation against side-channel attacks by, successively for each bit of the second number:
determining, independent of a state of the bit of the second number, an iterative calculation routine of the bit of the second number, wherein the determined iterative calculation routine is selected from a set of iterative calculation routines comprising a square-and-multiple always routine and a Montgomery multiplication routine, and the determining the iterative calculation routine of the bit of the second number is performed randomly; and
executing the determined iterative calculation routine of the bit, wherein a result of the iterative calculation is based on a result of the determined iterative calculation routine of a last bit of the second number.

24. The system of claim 23 wherein the iterative calculation is a scalar multiplication on an elliptic curve, the second number being a scalar to be multiplied by the first number.

25. The system of claim 23 wherein the one or more processing cores, in operation, process a transaction based on a result of the iterative calculation.

26. A non-transitory computer-readable medium, having contents which cause one or more processing devices to perform a method, the method comprising:
executing using an electronic circuit an iterative calculation on a first number and a second number, wherein the iterative calculation is a modular exponentiation, the second number representing an exponent to be applied to the first number, the executing including protecting the iterative calculation against side-channel attacks by, successively for each bit of the second number:
determining, independent of a state of the bit of the second number, an iterative calculation routine of the bit of the second number, wherein the determined iterative calculation routine is selected from a set of iterative calculation routines comprising a square-and-multiple always routine and a Montgomery multiplication routine, and the determining the iterative calculation routine of the bit of the second number is performed randomly; and
executing the determined iterative calculation routine; and
generating a result of the iterative calculation based on a result of the determined iterative calculation routine of a last bit of the second number.

27. The non-transitory computer-readable medium of claim 26 wherein the method comprises processing a transaction based on a result of the iterative calculation.

28. A system, comprising:
one or more processing cores, which, in operation, process digital data; and
cryptographic circuitry, coupled to the one or more processing cores, wherein the cryptographic circuitry, in operation, executes an iterative calculation on a first number and a second number, the executing including protecting the iterative calculation against side-channel attacks by, successively for each bit of the second number:
determining, independent of a state of the bit of the second number, an iterative calculation routine of the bit of the second number; and
executing the determined iterative calculation routine of the bit, wherein a result of the iterative calculation is based on a result of the determined iterative calculation routine of a last bit of the second number wherein the cyyptographic circuitry, in operation:
initializes a first memory location or register of the memory to one;
initializes a second memory location or register of the memory to a value of the first number; and
successively, for each bit of the second number:
selects an iterative calculation routine between a first routine and a second routine; and
in case of a change of routine, updates content of the second memory register or location before executing the selected iterative calculation routine,
wherein the result of the iterative calculation is contained in said first memory location or register after execution of the determined iterative calculation routine of the last bit of the second number.

29. The system of claim 28 wherein the iterative calculation is a modular exponentiation, the second number representing an exponent to be applied to the first number.

* * * * *

UNITED STATES PATENT AND TRADEMARK OFFICE
CERTIFICATE OF CORRECTION

PATENT NO. : 10,977,365 B2  
APPLICATION NO. : 16/041077  
DATED : April 13, 2021  
INVENTOR(S) : Ibrahima Diop et al.

Page 1 of 1

It is certified that error appears in the above-identified patent and that said Letters Patent is hereby corrected as shown below:

On the Title Page

Item (72) Inventors, Line 1:  
"Ibrahima Diop, Marseilles (FR);" should read, --Ibrahima Diop, Marseille (FR);--.

Item (56) References Cited, FOREIGN PATENT DOCUMENTS Column 2, Line 2:  
"FR 2 875 535 B1 3/2006" should read, --FR 2 875 355 B1 3/2006--.

Page 2, Item (56) References Cited, FOREIGN PATENT DOCUMENTS Column 1, Line 2:  
"FR 2 979 2725 A1 3/2013" should be removed.

In the Claims

Column 12, Line 65, Claim 12:  
"performed randomlv; and" should read, --performed randomly; and--.

Column 14, Line 47, Claim 26:  
"executing using an electronic circuit an iterative calculation" should read, --executing, using an electronic circuit, an iterative calculation--.

Column 16, Line 2, Claim 28:  
"wherein the cyyptographic circuitry, in operation:" should read, --wherein the cryptographic circuitry, in operation:--.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*